US008662857B2

(12) United States Patent
Hukriede et al.

(10) Patent No.: US 8,662,857 B2
(45) Date of Patent: Mar. 4, 2014

(54) PRESSURE CONTROL FOR A FLUID SPRAYER

(75) Inventors: Joshua James Hukriede, Crystal, MN (US); Frank Gregory Mirazita, Otsego, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 415 days.

(21) Appl. No.: 13/007,051

(22) Filed: Jan. 14, 2011

(65) Prior Publication Data

US 2011/0189032 A1  Aug. 4, 2011

Related U.S. Application Data

(60) Provisional application No. 61/299,733, filed on Jan. 29, 2010.

(51) Int. Cl.
F04B 35/04 (2006.01)

(52) U.S. Cl.
USPC .............................. 417/34; 239/127; 222/315

(58) Field of Classification Search
USPC .............................. 417/34; 239/127; 222/315
See application file for complete search history.

(56) References Cited

U.S. PATENT DOCUMENTS

| | | | |
|---|---|---|---|
| 3,985,467 A | 10/1976 | Lefferson | |
| 4,238,073 A * | 12/1980 | Liska | 239/127 |
| 5,107,753 A * | 4/1992 | Ioku | 91/512 |
| 5,169,068 A | 12/1992 | Bertolini | |
| 5,282,722 A | 2/1994 | Beatty | |
| 5,421,520 A | 6/1995 | Simonette et al. | |
| 5,520,517 A | 5/1996 | Sipin | |
| 5,711,483 A | 1/1998 | Hays | |
| 6,259,220 B1 | 7/2001 | Hays | |
| 6,419,456 B1 | 7/2002 | Cooper | |
| 6,648,603 B2 * | 11/2003 | Dexter et al. | 417/34 |
| 7,673,815 B2 | 3/2010 | Schroeder | |
| 2008/0099579 A1 | 5/2008 | Schroeder | |

FOREIGN PATENT DOCUMENTS

WO   2009079459 A1   6/2009

OTHER PUBLICATIONS

Graco's Complete Line of Professional Striping Equipment—Line Stripping Systems, Graco Inc. 336673 Rev. C 1/08, 16 pages. http://wwwd.graco.com/Distributors/DLibrary.nsf/Files/336673/$file/336673C.pdf, Accessed Jan. 6, 2010.

Energy Saving Variable Speed Pumping System, FYI Document #284 dated Jan. 6, 2010, 2 pages. http://www.advantageengineering.com/fyi/284/advantageFYI284.php, Acessed Jan. 6, 2010.

(Continued)

*Primary Examiner* — Charles Freay
*Assistant Examiner* — Patrick Hamo
(74) *Attorney, Agent, or Firm* — Kelly, Holt & Christenson, PLLC

(57) ABSTRACT

A fluid sprayer is provided and includes a fluid pump assembly having an outlet path and a motor assembly configured to drive the fluid pump assembly to pressurize fluid. The motor assembly is controlled by a throttle mechanism. The fluid sprayer also includes a fluid pressure control assembly including a mechanical pressure transducer configured to be displaced as a function of fluid pressure in the outlet path. The fluid pressure control assembly is configured to control the throttle mechanism as a function of displacement of the mechanical pressure transducer.

8 Claims, 12 Drawing Sheets

(56) References Cited

OTHER PUBLICATIONS

Pump Throttle Electronic Control Series II PTCE II, PN100509, for Mechanical Diesel Engines, 14 pages. http://www.class1.com/_Downloads/class1/general_downloads/Pump%20Throttle%20Electric%20Cotnrol,%20Series%202.pdf, Accessed Jan. 6, 2010.

Chinese Office Action for Chinese Patent Application No. 201110032643.0, dated May 6, 2013, 12 pages.

* cited by examiner

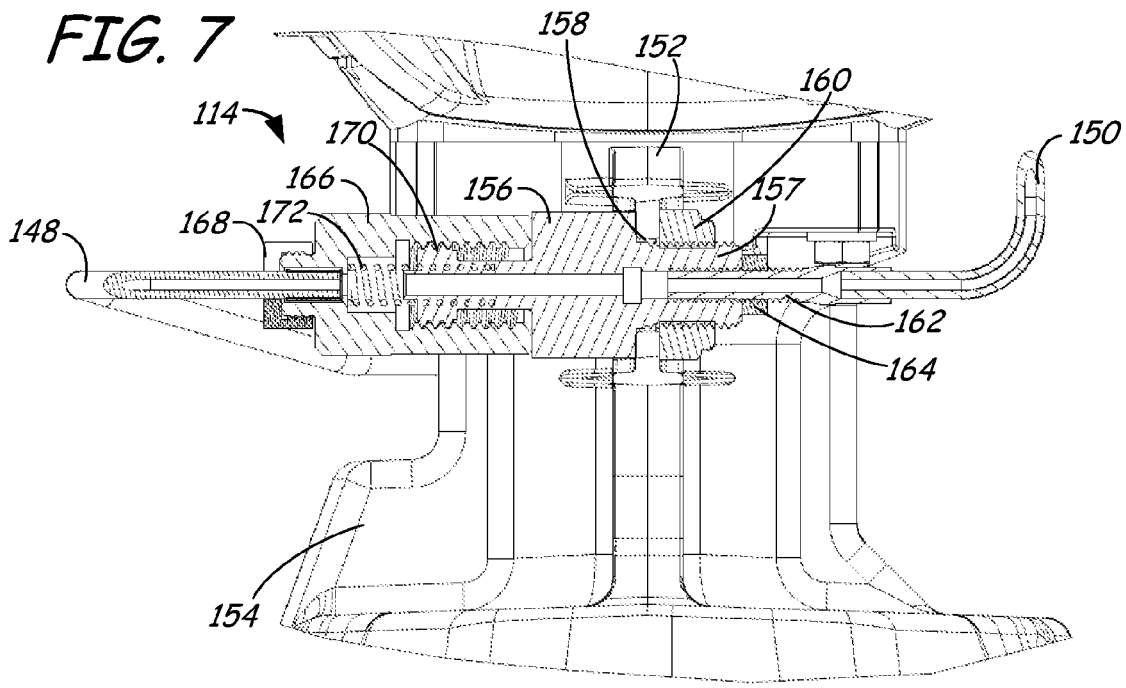
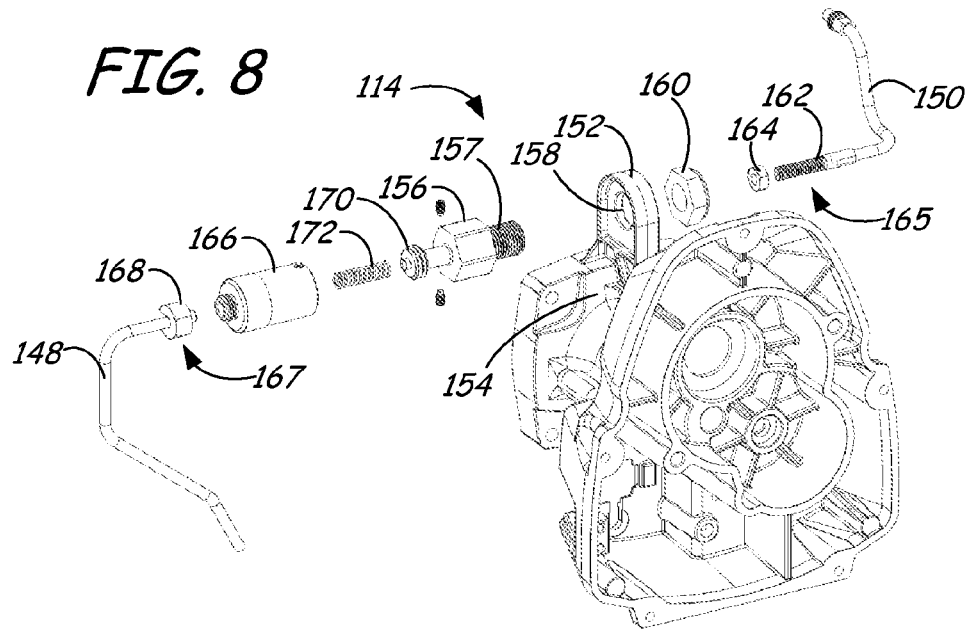

PRESSURE CONTROL FOR A FLUID SPRAYER

CROSS-REFERENCE TO RELATED APPLICATION

The present application claims the benefit of U.S. provisional patent application Ser. No. 61/299,733, filed on Jan. 29, 2010, the content of which is hereby incorporated by reference in its entirety.

BACKGROUND

Fluid sprayers include mechanisms for generating source(s) of pressurized fluid material and/or atomizing air. For example, airless fluid sprayers typically include a fluid pump assembly that operates to pressurize fluid material (e.g., paint) to be sprayed from an output nozzle or tip. A source of power (e.g., an electric motor, a gasoline engine, etc.) is configured to drive the fluid pump assembly. In one particular example, an internal combustion engine can be employed to drive a reciprocating piston pump that pressurizes fluid to be sprayed.

The discussion above is merely provided for general background information and is not intended to be used as an aid in determining the scope of the claimed subject matter.

SUMMARY

In one exemplary embodiment, a fluid sprayer is provided and includes a fluid pump assembly having an outlet path and a motor assembly configured to drive the fluid pump assembly to pressurize fluid. The motor assembly is controlled by a throttle mechanism. The fluid sprayer also includes a fluid pressure control assembly including a mechanical pressure transducer configured to be displaced as a function of fluid pressure in the outlet path. The fluid pressure control assembly is configured to control the throttle mechanism as a function of displacement of the mechanical pressure transducer.

In one exemplary embodiment, a fluid sprayer is provided and includes a fluid pump configured to generate a flow of pressurized fluid from a fluid pump outlet and a motor configured to drive the fluid pump. The fluid sprayer also includes a fluid pressure control mechanism including a pressure transducer configured to be displaced as a function of fluid pressure and mechanically coupled to the motor through at least one mechanical linkage assembly.

These and various other features and advantages will be apparent from a reading of the following Detailed Description. This Summary and Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

BRIEF DESCRIPTION OF THE DRAWINGS

FIG. 7 is a cross-section view of a user adjustment mechanism, under one embodiment.

FIG. 8 is an exploded view of a user adjustment mechanism, under one embodiment.

DETAILED DESCRIPTION OF ILLUSTRATIVE EMBODIMENTS

The present disclosure generally relates to fluid pumps, and more specifically, but not by limitation, to pressure control mechanisms for powered fluid sprayers. Examples of powered fluid sprayers include, but are not limited to, systems and devices that utilize motors (e.g., electric motors, internal combustion engines, etc.) to pressurize and spray fluid materials. Some particular examples include paint sprayers, stain sprayers, texture sprayers, line stripers, pressure washers, etc. As used herein, "fluid" or "fluid material" refers to liquids for spraying applications such as, but not limited to, paints, varnishes, stains, inks, texture materials, water, etc.

Figure 1:
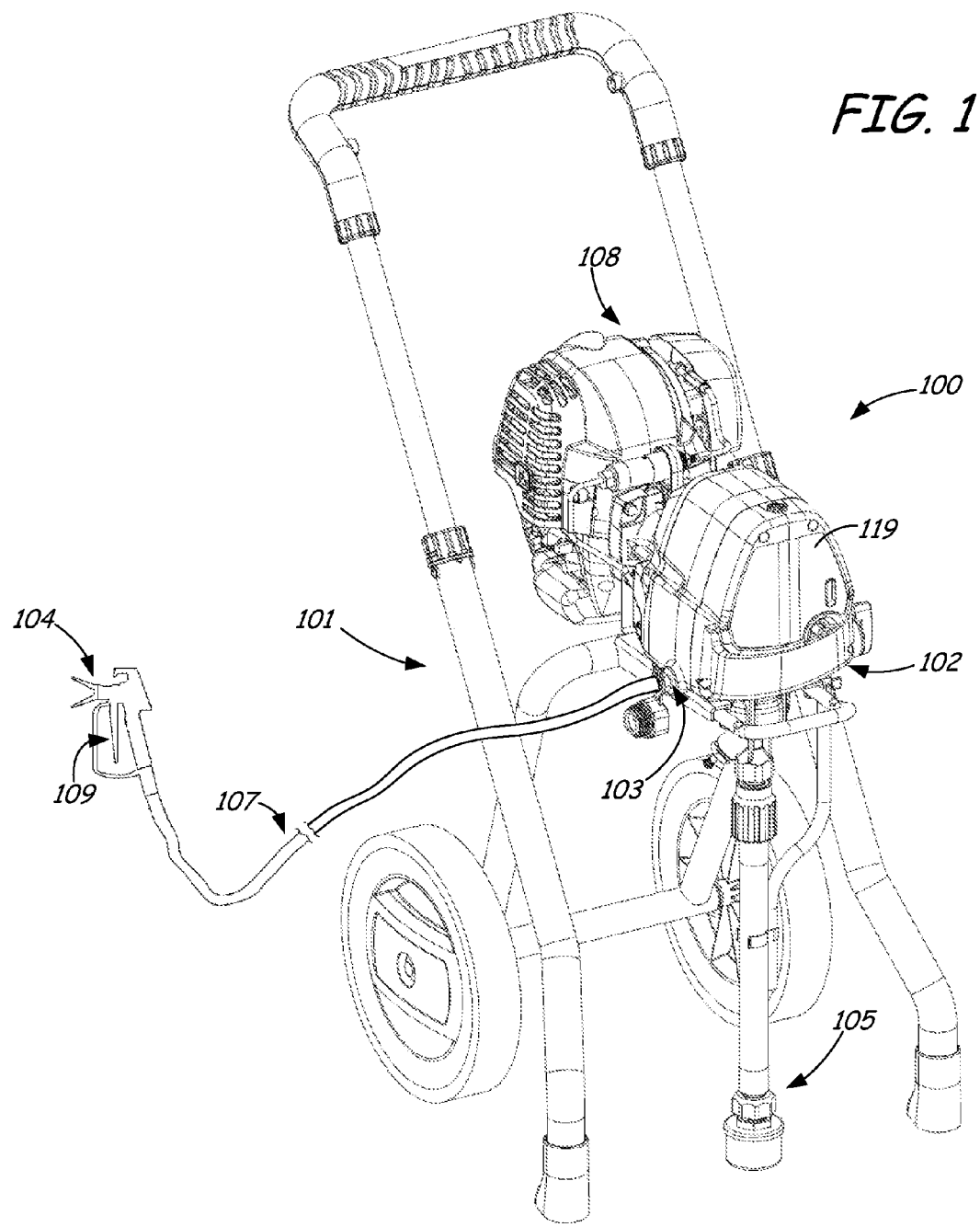
FIG. 1 is a perspective view of a powered fluid sprayer, under one embodiment.

FIG. 1 is a perspective view of a powered fluid sprayer 100, under one embodiment. Fluid sprayer 100 illustratively comprises a portable, cart-mounted paint sprayer configured to spray atomized paint onto various surfaces. Fluid sprayer 100 includes a fluid pump assembly 102 mounted on a cart 101 and configured to pressurize paint supplied from a paint container (not shown) by a suction set 105. The suction set 105 includes an inlet suction tube supplying a flow of paint from the container to fluid pump assembly 102 and a return tube providing a return flow of paint from fluid pump assembly 102 to the container, for example during priming of the fluid pump assembly 102.

Fluid pump assembly 102 generates a pressurized fluid flow that is released from an output 104 when a user actuates a trigger mechanism 109. Output 104 illustratively comprises a spray gun having a trigger mechanism 109, which opens a spray valve of the spray gun and delivers the pressured fluid to a nozzle or tip that is configured to generate a particular spray pattern. A spray gun hose 107 is attached to a connection 103 and fluidically couples the spray gun to an output port of the fluid pump assembly 102.

Figure 4:
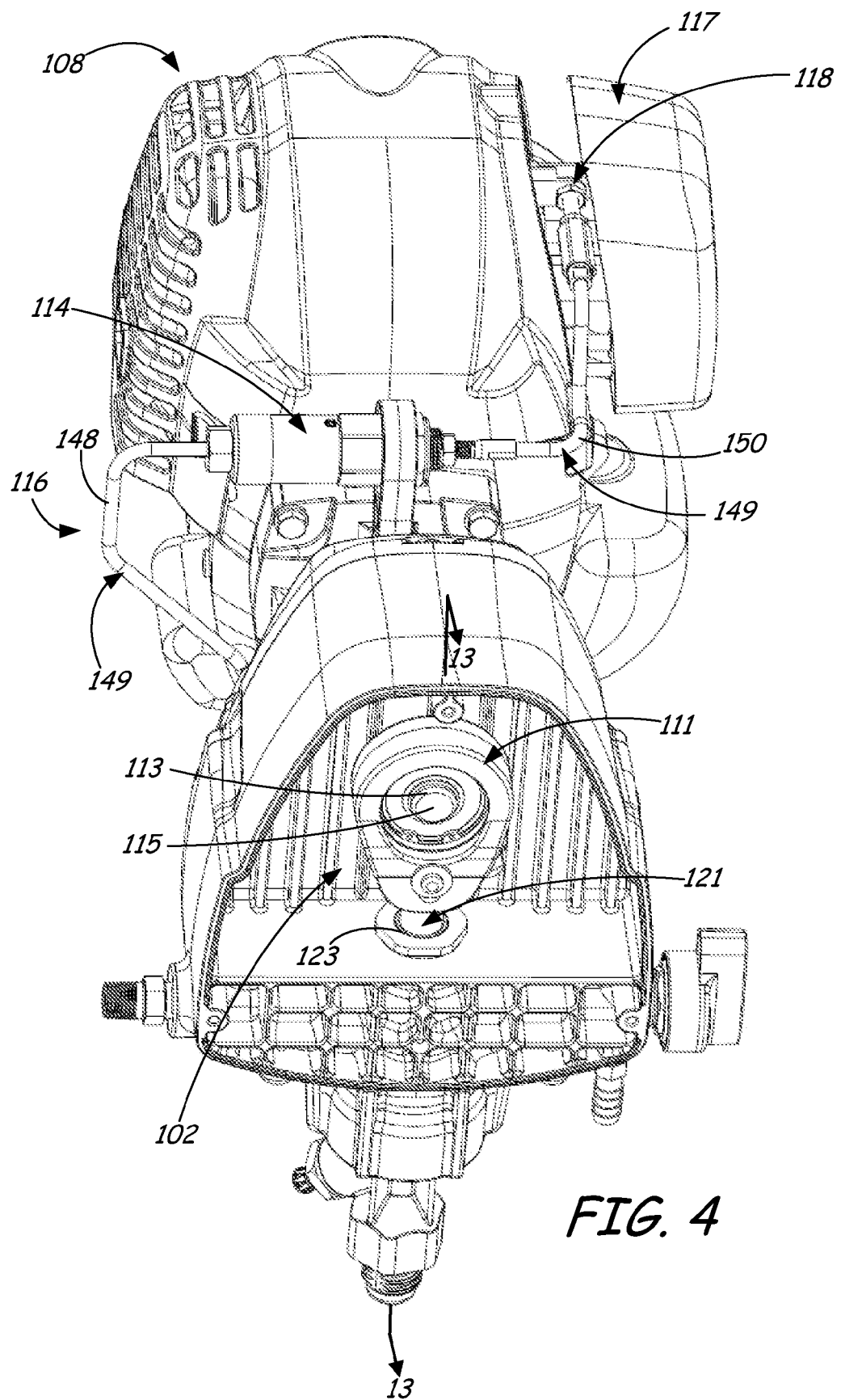

A motor assembly 108 is operably coupled to the fluid pump assembly 102 to drive a reciprocating piston assembly. In one embodiment, motor assembly 108 includes a rotating output shaft that is operably coupled (for example through one or more gear assemblies) to drive an output shaft 113 (illustrated in FIG. 4) of pump assembly 102. With reference to FIG. 4 in which a cover 119 of pump assembly 102 has been removed for illustration, output shaft 113 comprises an eccentric output shaft wherein a center line 115 is offset from a center of rotation of a drive gear assembly imparting rotation on the output shaft 113. In this manner, rotation imparted by the drive gear assembly produces orbital rotation of the eccentric output shaft 113. Accordingly, the eccentric output shaft 113 has both rotational motion and orbital motion. The orbital motion of the eccentric output shaft 113 is imparted to a yoke assembly 111 whereas the rotational motion of eccentric output shaft 113 is not imparted to the yoke assembly 111.

Figure 13:
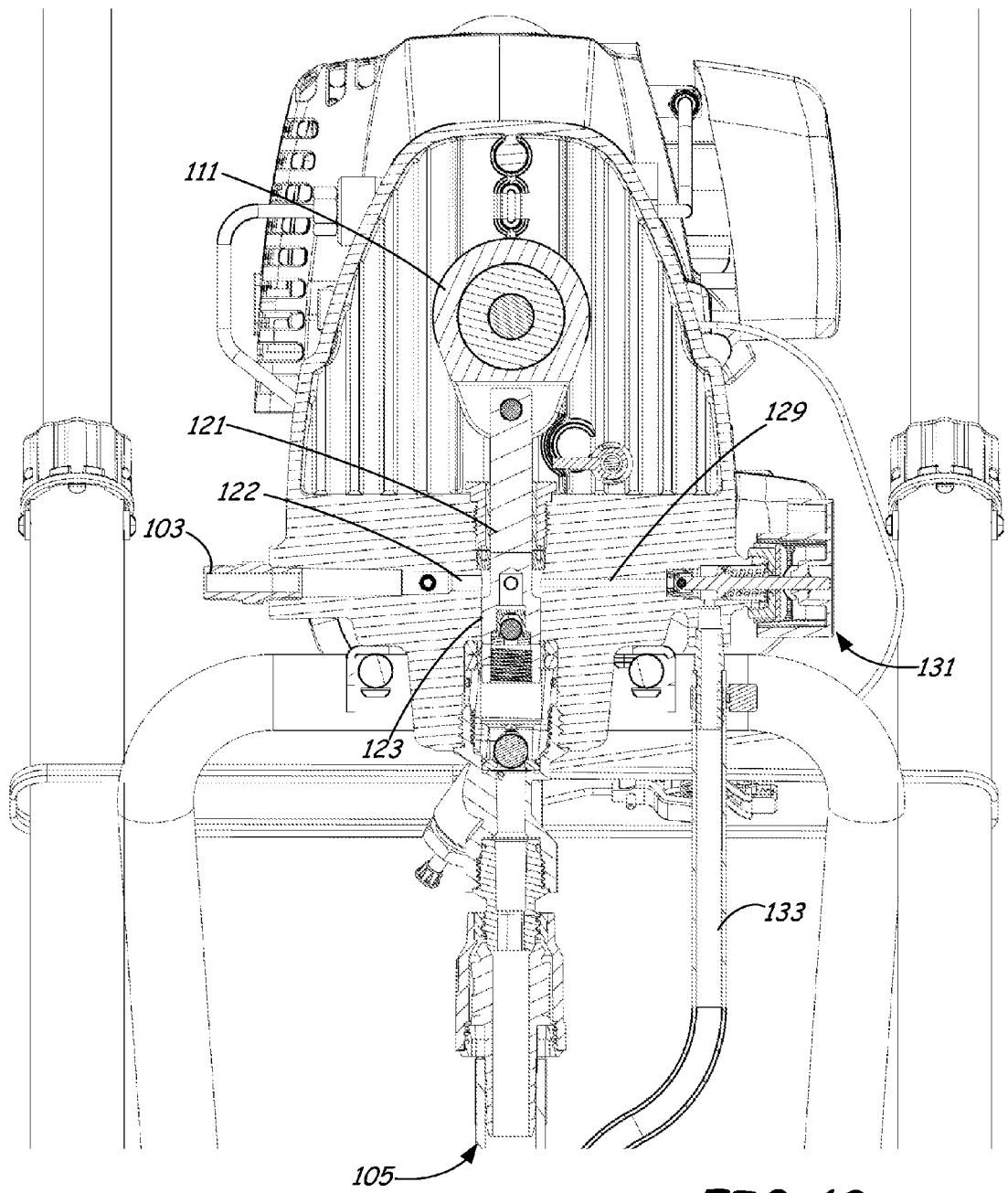
FIG. 13 is a cross-section view of a fluid pump assembly, under one embodiment.

FIG. 13 is a cross-section view taken at line 13-13 illustrated in FIG. 4. As shown, a piston assembly 121 is coupled to yoke assembly 111 and reciprocates within a cylinder 123 to pressurize fluid provided to cylinder through suction set 105. The pressurized fluid is output (for example to a spray gun hose coupled to connection 103) through an output port 122. A prime passage 129 is provided to a prime assembly 131. A user can select a prime position on the prime assembly 131, for example by rotating a knob, which opens a low flow resistance path from the pump assembly 102 through return tube 133.

Figure 2:
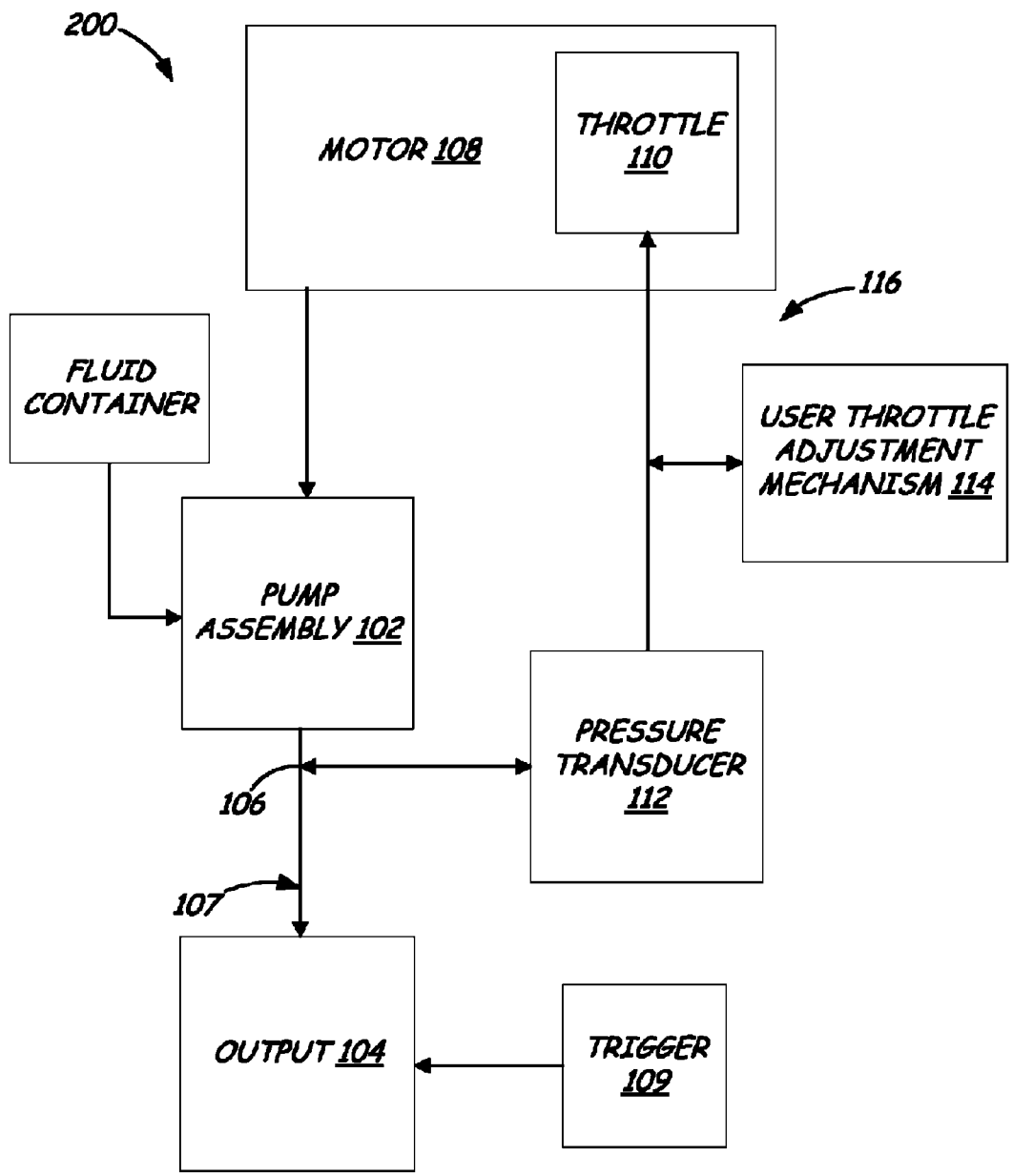
FIG. 2 is a schematic diagram illustrating components of a powered fluid sprayer, under one embodiment.

FIG. 2 is a schematic diagram 200 illustrating components of fluid sprayer 100, under one embodiment. Motor assembly 108 illustratively comprises an internal combustion engine configured to run on gasoline, for example, and including a centrifugal clutch and a throttle 110 that is selectively adjustable between open and closed positions. Throttle 110 comprises a conventional mechanism by which a flow of inlet gasses is regulated to increase or decrease the speed of the engine. The centrifugal clutch actuates when a predetermined motor speed has been reached. An internal combustion engine with centrifugal clutch is typically considered low cost in comparison to more sophisticated motor assemblies, such as those employing electromagnetic clutches, for example. In other embodiments, motor assembly 108 can comprise other types of motors such as, but not limited to, electric motors and other types of internal combustion engines that run on other suitable fuel types.

Controlling fluid pressure within fluid spraying systems, such as fluid sprayer 100, is important for at least several reasons. By way of example, changes in fluid pressure in the system above or below a desired or optimal fluid pressure can affect the size and shape of the spray pattern and/or the spray volume. This can cause undesired under or over-spray, for instance. Further, during periods when fluid is not being sprayed (i.e., the user is not actuating a spray gun trigger) the motor often continues to run at high or substantial throttle levels. For instance, the motor may continue to run at full or significant throttle resulting in a waste of motor fuel, excess wear on the motor and/or pump, the fluid pressure exceeding a threshold, and/or requiring fluid pressure to be bled from the system.

In accordance with one embodiment, an effective, cost-efficient pressure control mechanism is provided for fluid sprayer 100 and is configured to control the speed of motor assembly 108, and thus the fluid pressure generated by fluid pump assembly 102. Illustratively, a pressure control mechanism 116 includes a pressure sensor component for sensing pressure of the fluid material (generally represented by reference numeral 106) that is pressurized by pump assembly 102. This sensed pressure 106 is indicative of the pressure of the fluid in spray gun hose 107. In the illustrated embodiment, throttle 110 is controlled based on fluid pressure sensed using a pressure transducer 112 that is fluidically coupled to the pressurized flow fluid in an outlet path from fluid pump assembly 102.

Pressure transducer 112 comprises a device that is configured to generate an output or other suitable response that is indicative of a fluid pressure input. Pressure transducer 112 can comprise mechanical pressure transducers configured to convert fluid pressure into mechanical displacement and/or electronic pressure transducers configured to generate electronic output signals based on a sensed pressure. In embodiments discussed below, pressure transducer 112 is operably coupled (for example, through one or more mechanical linkage assembly components) to throttle 110 to mechanically actuate and adjust the position of throttle 110, and thus the operation of motor assembly 108, in response to changes in the fluid pressure 106 from pump assembly 102. It is noted that while pressure transducer 112 is illustrated below as being mechanically coupled to the motor assembly 108 using a cable, other mechanisms can be utilized for controlling the throttle position. For example, hydraulic or pneumatic connections can be used. In one embodiment, an electronic control signal can be generated based on the sensed pressure (i.e., the displacement of the pressure transducer 112), which can be transmitted to the motor assembly 108 and utilized to control the throttle position.

Figure 3:
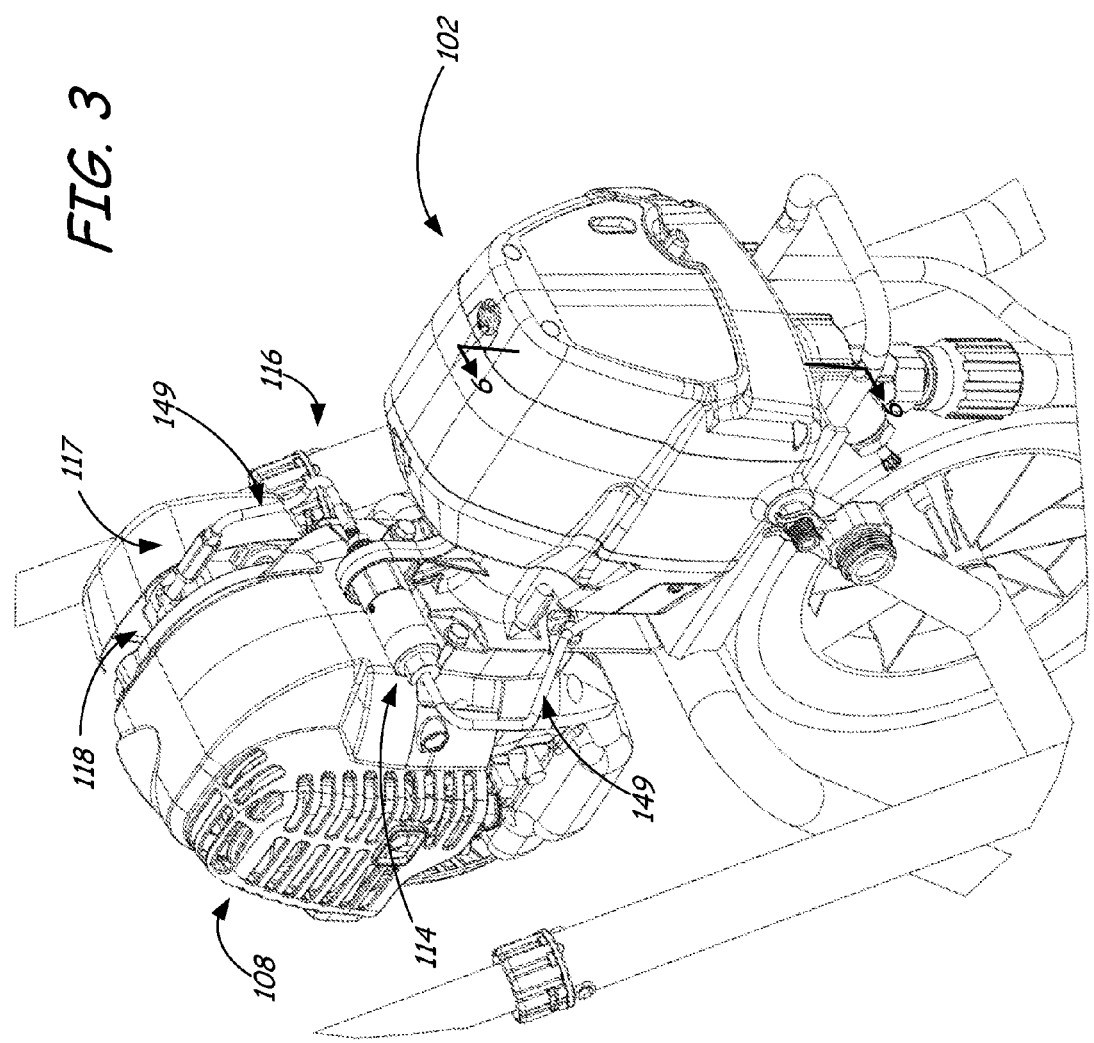
FIGS. 3-5 are perspective views illustrating a pressure control mechanism for a powered fluid sprayer, under one embodiment.
Figure 5:
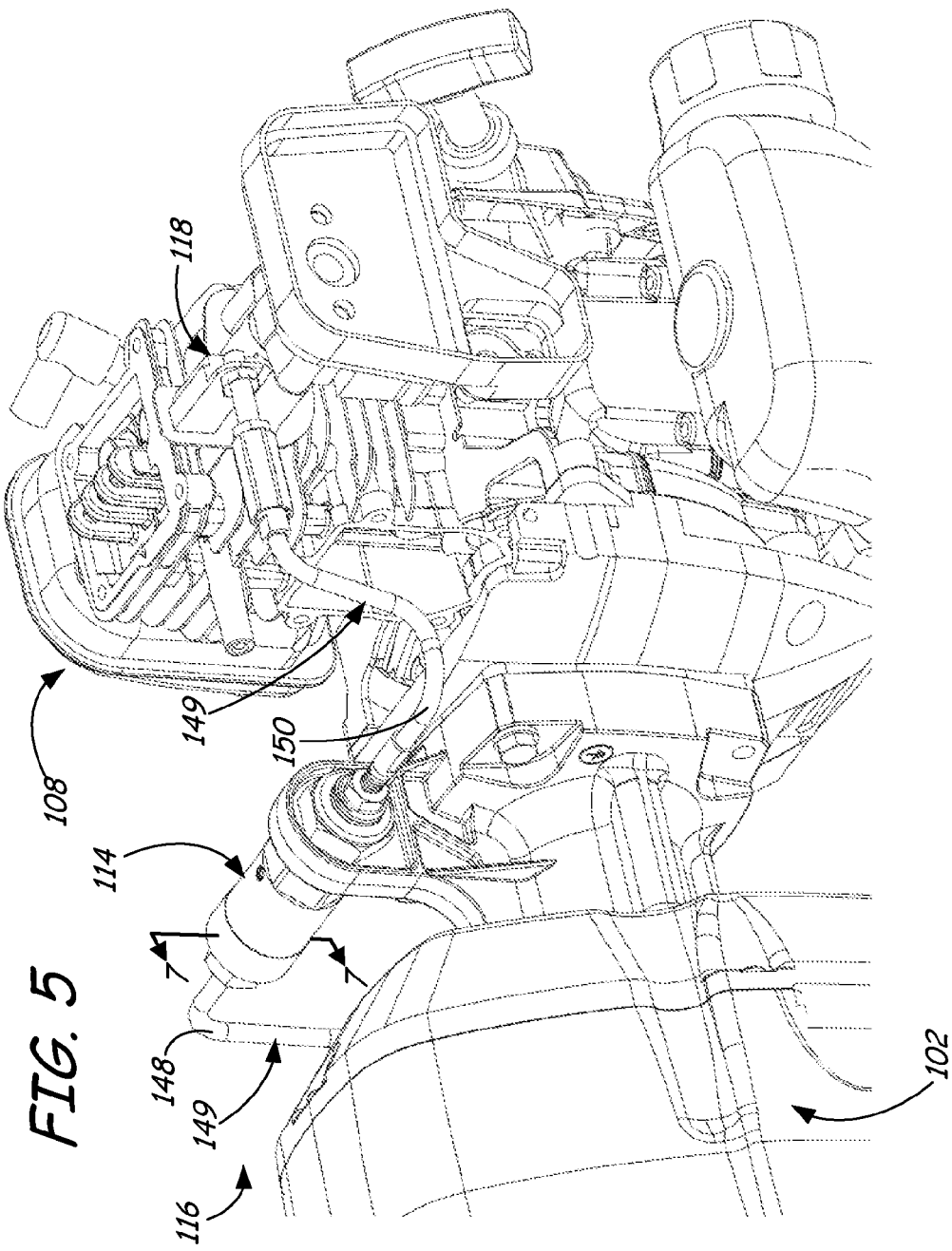
Figure 6:
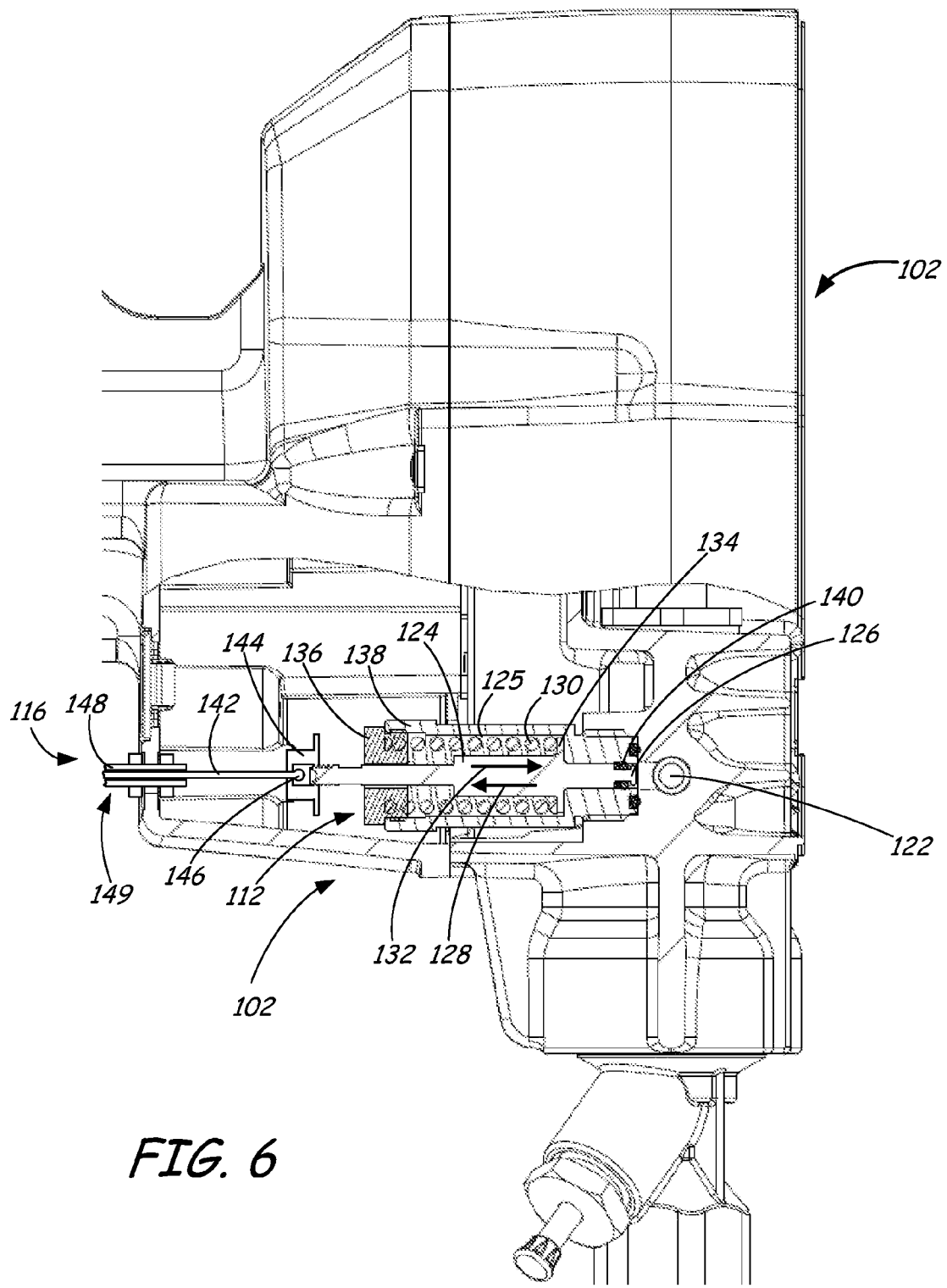
FIG. 6 is a cross-section view of a portion of a fluid pump assembly including a pressure transducer, under one embodiment.

FIGS. 3-6 illustrate one embodiment of pressure control mechanism 116. FIGS. 3 and 4 are side and top perspective views, respectively, of motor assembly 108 and fluid pump assembly 102. FIG. 5 illustrates motor assembly 108 with a cover 117 omitted for illustration purposes. FIG. 6 is a cross-section view (taken at line 6-6 illustrated in FIG. 3) of a portion of fluid pump assembly 102.

As shown in FIGS. 3-5, motor assembly 108 illustratively comprises a gasoline engine that is configured to drive fluid pump assembly 102 and includes a throttle mechanism (generally illustrated by arrow 118) operable to control the engine speed. In the illustrated embodiment, pressure control mechanism 116 includes one or more mechanical linkage assembly components operably coupling a pressure sensor (i.e., pressure transducer 112) of pump assembly 102 to throttle 118. As described in further detail below, pressure control mechanism 116 is configured to control operation of motor assembly 108 as a function of a fluid pressure in an output port of pump assembly 102.

As shown in FIG. 6, pressure transducer 112 is in fluid communication with the pressurized fluid in output port 122. Pressure transducer 112 comprises a plunger 124 that is movable within a chamber 125 and is configured to be linearly displaced as a function of the fluid pressure in output port 122. To illustrate, as fluid pressure in port 122 increases the force against a proximal end 126 of plunger 124 moves plunger 124 in a direction represented by arrow 128 against a bias of a compression spring 130, which provides a force against plunger 124 in an opposite direction 132. A first end of spring 130 engages a radially extending plate or shoulder 134 of plunger 124 and a second end of spring 130 engages a plug or end wall 136 of a housing 138 forming chamber 125. Plunger 124 projects through an aperture formed in plug or end wall 136. A seal 140 is provided around a portion of plunger 124 (illustrative at the proximal end 126) to prevent fluid from leaking along plunger 124 and into chamber 125.

During operation of the fluid sprayer, the displacement of plunger 124 of pressure transducer 112 is a function of the particular fluid pressure in output port 122. Pressure control mechanism 116 includes a mechanical linkage assembly 149 that operably couples pressure transducer 112 to throttle 118. In the illustrated embodiment, plunger 124 is mechanically coupled, through assembly 149, to throttle 118 such that movement of plunger 124 in directions 128 and 132, in response to fluid pressure changes, causes a corresponding adjustment of the throttle position to increase or decrease the speed of the motor assembly. The pressure control mechanism 116 including pressure transducer 112 and linkage assembly 149 decreases the throttle as the pressure in output port 122 increases, and increases the throttle as the pressure in output port 122 decreases. The pressure control mechanism 116 is configured to control the speed of the motor to maintain the output fluid pressure within a desired pressure range.

Mechanical linkage assembly 149 comprises a cable 142, and/or other suitable linkage component(s), that is operably connected to plunger 124. A first end of cable 142 is connected to plunger 124 by a plunger cap 144 and a second end of cable 142 is connected to throttle 118. Cap 144 is secured to plunger 124 and includes an aperture formed therein that accommodates cable 142. The first end of cable 142 (illustratively a ball 146) is larger than the aperture and prevents cable 142 from being pulled through the cap 144. Cable 142 is accommodated within a conduit assembly that includes a first conduit 148 that is secured to a portion of pump assembly 102. While a single cable 142 is illustrated connecting plunger 124 and throttle 118, it is noted that in other embodiments two or more cables, or other suitable linkage components, can be utilized to mechanically couple pressure transducer 112 and throttle 118.

Referring again to FIGS. 3-5, linkage assembly 149 includes first and second conduits 148 and 150 that each accommodates a portion of cable 142 therein. Linkage assembly 149 also includes a user adjustment mechanism 114 configured to enable a user to adjust or tune the performance of fluid sprayer 100, as desired. By making adjustments using mechanism 114, a user can change the position of throttle 110 for a same displacement of pressure transducer 112. Mechanism 114 can be utilized by the user to perform throttle adjustments in the field, for instance during a spraying application to limit under or over-spray. By way of example, in some situations a user may desire to adjust the throttle setting based on a desired application, a type of fluid media being sprayed, performance of the sprayer, etc.

User adjustment mechanism 114 is illustratively attached to conduits 148 and 150. Conduit 148 extends between pump assembly 102 and user adjustment mechanism 114 and conduit 150 extends between user adjustment mechanism 114 and throttle 118. User adjustment mechanism 114 and conduits 148 and 150 form the conduit assembly that extends between pump assembly 102 and motor assembly 108 and houses cable 142.

FIGS. 7 and 8 illustrate one embodiment of user adjustment mechanism 114. FIG. 7 is a cross-section view taken at line 7-7 illustrated in FIG. 5. FIG. 8 is an exploded view of user adjustment mechanism 114. Cable 142 has been omitted in FIGS. 7 and 8 for illustration purposes.

User adjustment mechanism 114 comprises a bracket 152 formed by a portion of housing 154. A fastener body 156 comprises a threaded portion 157 that is inserted through an aperture 158 formed in bracket 152 and is secured by a locking nut 160 to bracket 152. A threaded component 162 disposed on an end 165 of conduit 150 is threadably received within portion 157. Using a nut 164, end 165 is secured to body 156. In this manner, end 165 of conduit 150 is fixed with respect to bracket 152.

An adjustable knob 166 is attached to an end 167 of conduit 148 using a fastener 168 such that knob 166 is rotatable on end 167. Knob 166 is threadably received on a second, threaded end 170 of body 156. As a user rotates adjustable knob 166 in a first direction (i.e., clockwise) with respect to body 156 which is fixedly attached to bracket 152, the interaction of the corresponding threads pulls knob 166 toward body 156. This causes the ends 165 and 167 of conduits 148 and 150 to move closer together, thus effectively shortening the length of the conduit assembly housing cable 142. In turn, this causes cable 142 to allow the throttle 118 to decrease for a given pressure transducer displacement. In other words, the throttle closes to a greater extent (for the same pressure transducer displacement) as the user rotates knob 166 in the first direction.

Likewise, when a user rotates knob 166 in a second, opposite direction (i.e., counter-clockwise) with respect to body 156, knob 166 is moved away from body 156. This causes the ends 165 and 167 of conduits 148 and 150 to move further apart, thus effectively lengthening the conduit assembly housing cable 142. In turn, this causes cable 142 to increase the throttle 118 position for a given pressure transducer displacement. In other words, the throttle opens to a greater extent (for the same pressure transducer displacement) as the user rotates knob 166 in the second direction. In one embodiment, a compression spring 172 is disposed between knob 166 and body 156 and discourages inadvertent or undesired rotation of knob 166 caused by vibration, for example.

In one embodiment, movement of the throttle 118 is directly proportional to the displacement of pressure transducer 112. For example, in one particular embodiment displacement of the pressure transducer 112 causes the same, or at least substantially the same, movement of cable 142 and thus throttle mechanism 118 (e.g., if the pressure transducer moves approximately 0.25 inch the throttle 118 is moved approximately 0.25 inch).

One or more mechanical advantage mechanisms can be provided to amplify (or alternatively, to reduce) the movement of the throttle 118 with respect to the displacement of the pressure transducer 112. For example, the throttle 118 can be configured to move approximately 0.5 inch when the pressure transducer 112 moves approximately 0.25 inch. Examples of components that can be utilized include, but are not limited to, cams, wheels, levers, gears, pulleys and/or sprockets, to name a few.

Figure 9:
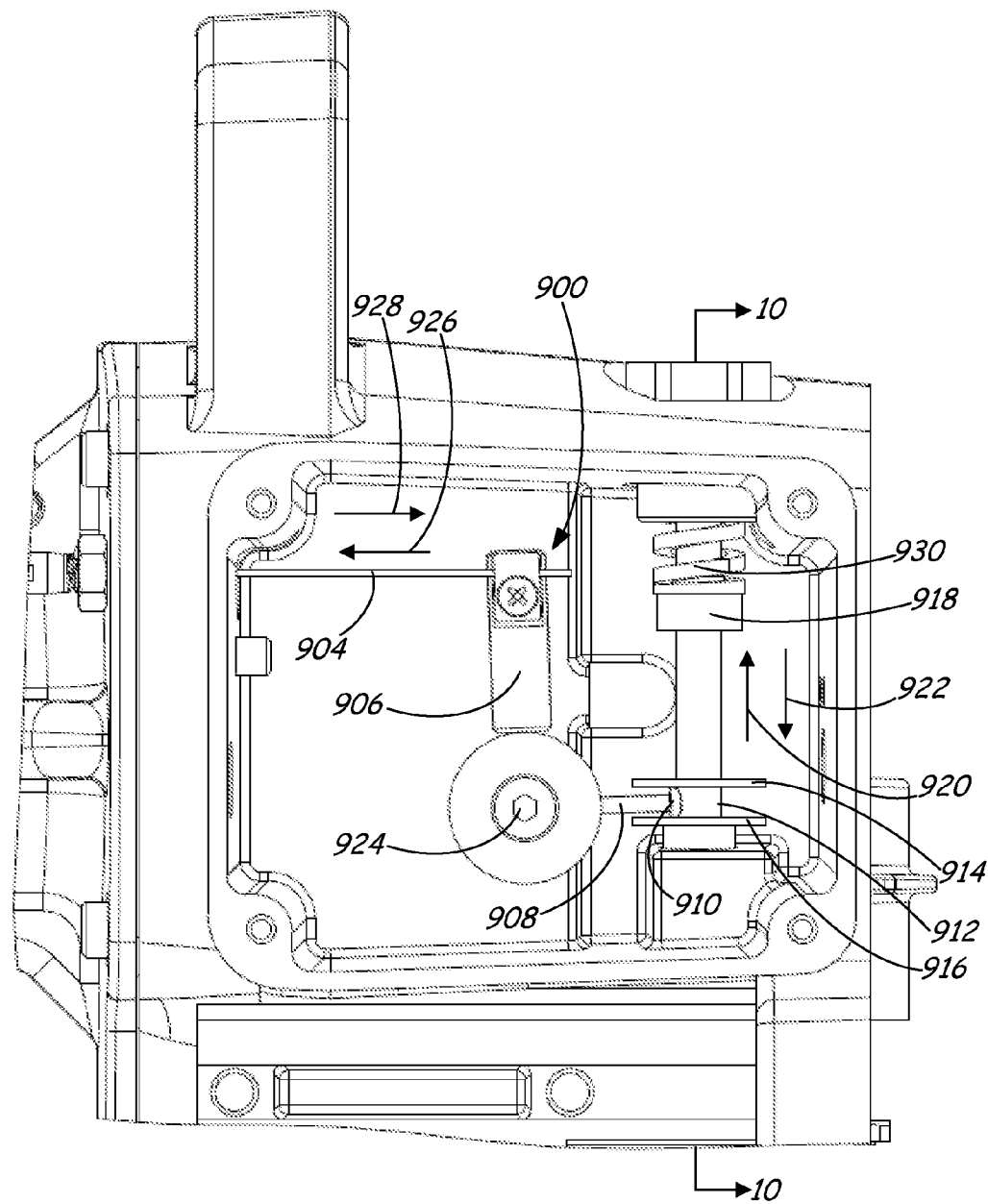
FIGS. 9 and 10 illustrate one embodiment of a mechanical linkage assembly.
Figure 10:
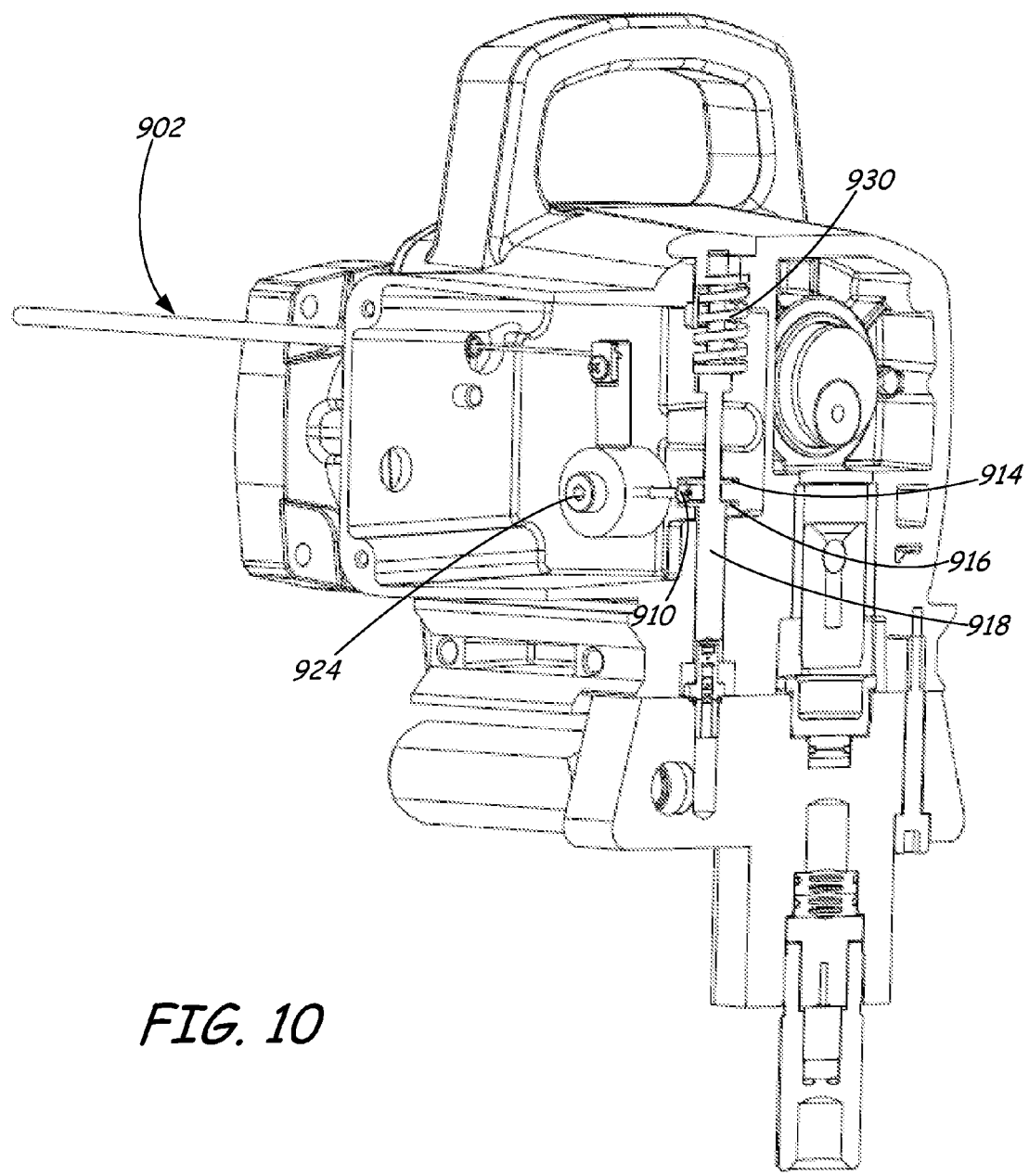

FIGS. 9 and 10 illustrate one embodiment of a dual level mechanism 900 for a mechanical linkage assembly that is configured to provide a mechanical advantage in actuating the throttle in response to displacement of the pressure transducer. FIG. 10 is a cross-section view taken at line 10-10 illustrated in FIG. 9.

The mechanical linkage assembly includes a cable 904 that operably couples mechanism 900 and a throttle, such as throttle 118. Cable 904 is illustratively similar to cable 142. Mechanism 900 includes a first arm 906 connected to cable 904 and a second arm 908 connected to arm 908. An end 910 of arm 908 is positioned in a gap 912 between a pair of spaced apart discs 914 and 916 of a pressure transducer 918. As pressure transducer 918 moves in directions 920 or 922 (in response to changes in the fluid pressure), arms 906 and 908 rotate about an axis 924 moving the cable 904 in directions 926 or 928 to control the throttle. Spring 930 applies a biasing force against pressure transducer 918.

The respective lengths of and angle between arms 906 and 908 can be selected based on the desired force and distance for movement of cable 904. By way of example, the lengths of arms 906 and 908 are selected such that a 0.25 inch movement of pressure transducer 918 causes a 0.5 inch adjustment of the throttle. It is noted that this is one example of mechanism 900 and is not intended to limit the scope of the concepts described herein. Mechanism 900 can be configured to amplify (or reduce) the movement of cable 904, and thus the throttle, by any desired factor.

Figure 11:
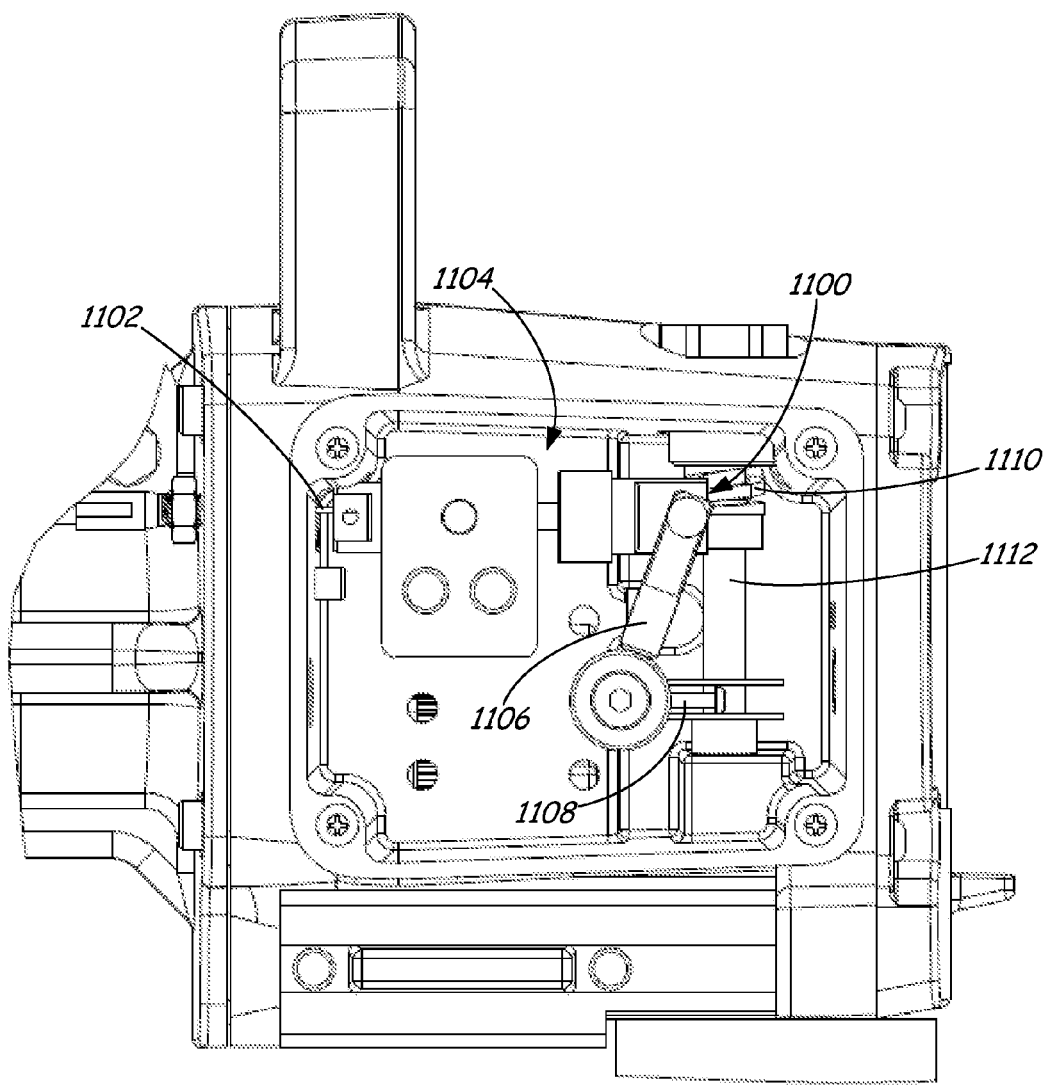
FIGS. 11 and 12 illustrate one embodiment of a mechanical linkage assembly.

FIG. 11 is a side view illustrating one embodiment of a mechanical linkage assembly including a dual lever mechanism 1100. Mechanism 1100 includes a first arm 1106 and a second arm 1108 that are illustratively oriented at an angle with respect to one another that is less than ninety degrees. In other embodiments, other angles between arms 1106 and 1108 can be utilized. Movement of pressure transducer 1112 in response to fluid pressure changes actuates mechanism 1100. Spring 1110 applies a biasing force against pressure transducer 1112.

Arm 1106 of mechanism 1100 is operably coupled to a cable 1102 of the mechanical linkage assembly through an auxiliary or secondary subassembly 1104. As described in further detail below, subassembly 1104 is separate from pressure transducer 1112 and is configured to apply a secondary force, separate from the pressure transducer 1112, to the mechanical linkage assembly to actuate the throttle for some throttle positions. In the illustrated embodiment, subassembly 1104 is configured to actuate the throttle in "low end" throttle positions below a first threshold (e.g., five percent of full throttle, ten percent of full throttle, etc.) and in "high end" throttle positions above a second threshold (e.g., ninety percent of full throttle, ninety five percent of full throttle, etc.).

By way of example, when the fluid pressure increases to a point where the throttle is below the first threshold position, subassembly 1104 operates to advance the mechanical linkage assembly 1102 in a first direction represented by arrow 1113 in FIG. 12 to further slow the speed of the motor. This can be particularly advantageous with motor assemblies employing centrifugal clutches to extend the life of the fluid sprayer components. For instance, subassembly 1104 can prevent the motor from operating at low speeds in which the centrifugal clutch is not fully engaged and experiences slipping, which can cause excessive degradation of the clutch and/or other motor components.

Figure 12:
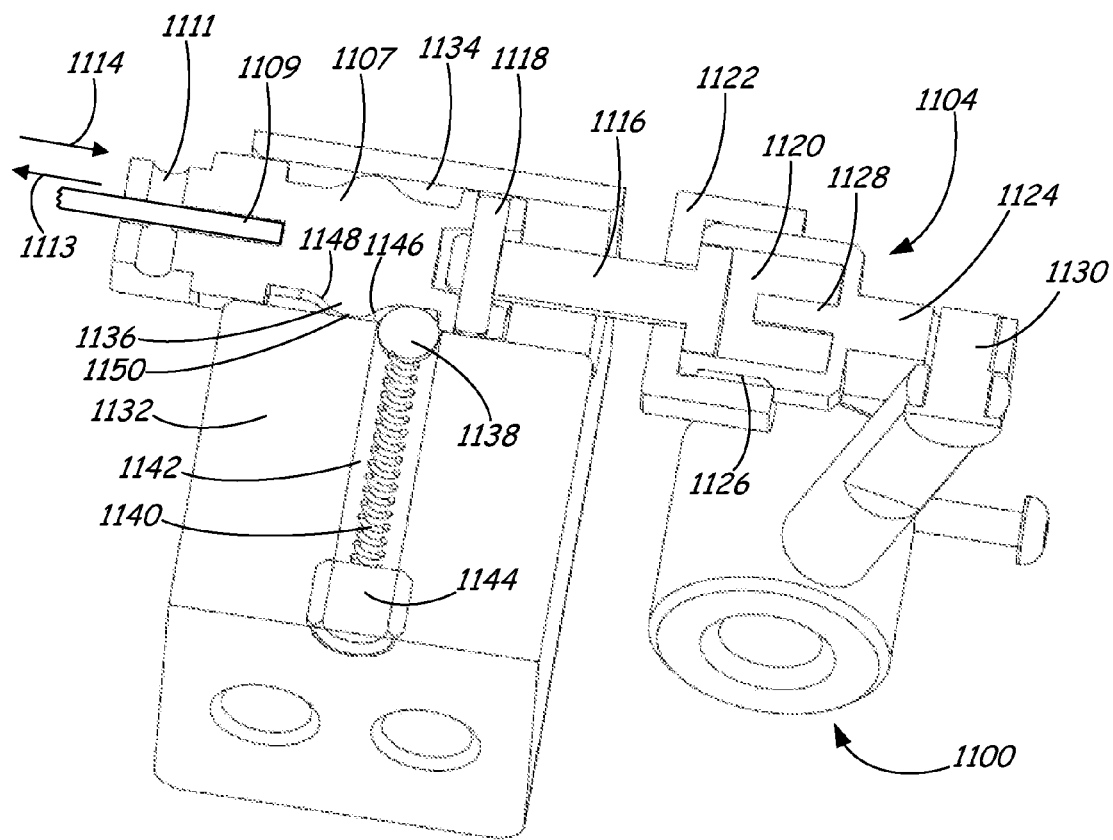

Similarly, when the fluid pressure decreases to a point where the throttle position is in the second range (i.e., the throttle exceeds the second threshold), subassembly 1104 operates to advance the mechanical linkage assembly 1102 in a second direction represented by arrow 1114 in FIG. 12 to further increase the speed or "rev up" the motor, which can reduce the likelihood of a significant fluid pressure drop while spraying.

FIG. 12 is a perspective view of mechanism 1100 and subassembly 1104, under one embodiment. For illustration, subassembly 1104 is shown in cross-section in FIG. 12. Subassembly 1104 includes a member 1107 that is movable within a first chamber 1134 of a mounting body or block 1132 and includes a rounded protuberant surface 1136. Member 1107 is secured to cable 1109 using a fastener (not shown in FIG. 12), such as a pin or clamp, positioned within a recess 1111 formed in member 1107. Subassembly 1104 is secured within the pump assembly using block 1132.

Member 1107 is attached to a first end of a plunger member 1116 using a fastener 1118, such as a pin. A second end of member 1116 is retained within a cavity 1120 that is formed between components 1122 and 1124, which are attached together by a threaded connection 1126. In one embodiment, the second end of member 1116 floats within cavity 1120 between surfaces of component 1122 and a protrusion 1128 of component 1124. In another embodiment, the second end of member 1116 can be fixedly attached to one or more of components 1122 and 1124. Component 1124 is attached to mechanism 1100 by a fastener 1130, such as a pin.

Subassembly 1104 also includes a ball 1138 that is forced against member 1107 using a spring 1140 positioned in a second chamber 1142 formed in block 1132. A first end of spring 1140 engages ball 1138 and a second end of spring 1140 engages a plug 1144 attached to block 1132. By way of example, when the throttle position is between the first and second thresholds discussed above, ball 1138 engages the rounded protuberance 1136 proximate apex 1150. In this manner, ball 1138 applies little, if any, force against member 1107 in directions 1113 or 1114. However, when the throttle position falls below the first threshold (or exceeds the second threshold), the apex 1150 is positioned further away from ball 1138 and the force of ball 1138 against curved portions 1146 or 1148 of protuberant surface 1136 further decreases or increases the throttle position.

It is noted that while subassembly 1104 is illustrated in FIGS. 11 and 12 with dual lever mechanism 1100, subassembly 1104 can be utilized with other types of, or without, mechanical advantage mechanisms. For example, in one embodiment subassembly 1104 can be directly connected to a pressure transducer, such as pressure transducer 112 illustrated in FIG. 6.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fluid sprayer comprising:
   a fluid pump configured to generate a flow of pressurized fluid from a fluid pump outlet;
   a motor configured to drive the fluid pump, the motor having a motor control component, wherein displacement of the motor control component controls operation of the motor; and
   a fluid pressure control mechanism including a pressure transducer configured to be displaced as a function of fluid pressure and mechanically coupled to the motor control component through at least one mechanical linkage assembly that displaces the motor control component as a function of displacement of the pressure transducer, the mechanical linkage assembly including a device configured to amplify or reduce the displacement of the motor control component relative to the displacement of the pressure transducer, wherein the device is configured to rotate about an axis and comprises a first arm operably coupled to the pressure transducer and a second arm configured to control a speed of the motor in response to rotation of the device caused by displacement of the pressure transducer.

2. The fluid sprayer of claim 1, wherein the motor control component comprises a throttle of an internal combustion engine.

3. The fluid sprayer of claim 1, wherein the first and second arms having different lengths from each other.

4. A fluid sprayer comprising:
   a fluid pump assembly having an outlet path;
   a motor assembly configured to drive the fluid pump assembly to pressurize fluid; and
   a pressure control assembly comprising:
      a pressure transducer configured to be displaced as a function of fluid pressure in the outlet path; and
      a flexible cable operably coupling the pressure transducer and the motor assembly such that displacement of the mechanical pressure transducer causes a displacement of a component that controls a speed of the motor assembly.

5. The fluid sprayer of claim 4, wherein the flexible cable passes through a user adjustment mechanism configured to adjust a throttle position of the motor assembly for a same position of the pressure transducer.

6. The fluid sprayer of claim 5, wherein the flexible cable is at least partially housed within a conduit assembly.

7. The fluid sprayer of claim 6, wherein the conduit assembly comprises a first conduit housing a first portion of the cable and a second conduit housing a second portion of the cable, the user adjustment mechanism being attached to the first and second conduits.

8. The fluid sprayer of claim 7, wherein the user adjustment mechanism comprises an adjustable component configured to move ends of the first and second conduits with respect to one another.

* * * * *